United States Patent
Meier et al.

(10) Patent No.: US 7,757,553 B2
(45) Date of Patent: Jul. 20, 2010

(54) FLOW DETECTOR WITH A HOUSING

(75) Inventors: Lorenz Meier, Zürich (CH); Mark Hornung, Männedorf (CH); Eric Monnin, Männedorf (CH); Felix Mayer, Stäfa (CH)

(73) Assignee: Sensirion AG, Stafa (CH)

( * ) Notice: Subject to any disclaimer, the term of this patent is extended or adjusted under 35 U.S.C. 154(b) by 0 days.

(21) Appl. No.: 12/383,170

(22) Filed: Mar. 20, 2009

(65) Prior Publication Data
US 2009/0249869 A1  Oct. 8, 2009

Related U.S. Application Data

(60) Provisional application No. 61/123,487, filed on Apr. 9, 2008.

(30) Foreign Application Priority Data

Apr. 4, 2008  (EP) .................................. 08006853

(51) Int. Cl.
*G01F 1/68* (2006.01)
(52) U.S. Cl. .................................. 73/204.22
(58) Field of Classification Search .. 73/204.22–204.26
See application file for complete search history.

(56) References Cited

U.S. PATENT DOCUMENTS

| | | | |
|---|---|---|---|
| 4,326,214 A * | 4/1982 | Trueblood | 257/681 |
| 4,548,078 A | 10/1985 | Bohrer et al. | |
| 4,672,997 A | 6/1987 | Landis et al. | |
| 4,677,850 A | 7/1987 | Miura et al. | |
| 4,829,818 A | 5/1989 | Bohrer | |
| 5,061,193 A | 10/1991 | Seaman | |
| 5,081,866 A | 1/1992 | Ochiai et al. | |
| 5,228,329 A | 7/1993 | Dennison | |
| 5,396,795 A | 3/1995 | Araki | |
| 5,404,753 A | 4/1995 | Hecht et al. | |
| 5,750,892 A | 5/1998 | Huang et al. | |
| 5,763,787 A * | 6/1998 | Gravel et al. | 73/756 |
| 5,804,717 A | 9/1998 | Lucas | |
| 5,944,048 A | 8/1999 | Bump et al. | |
| 6,032,527 A | 3/2000 | Genova et al. | |
| 6,119,730 A | 9/2000 | McMillan | |
| 6,176,131 B1 | 1/2001 | Hecht et al. | |

(Continued)

FOREIGN PATENT DOCUMENTS

DE  10129300  2/2002

(Continued)

*Primary Examiner*—Jewel Thompson
(74) *Attorney, Agent, or Firm*—Cooper & Dunham LLP

(57) ABSTRACT

A flow detector has a housing (1) with tongues (8), which allow to anchor it to a support to withstand pulling forces. The housing further comprises pegs (41) provided to mate with openings or recesses in the same support, which allow to secure it against lateral forces. The tongues (8) and pegs (41) are mounted to a hull (7) of a housing (1) of the detector, which carries on its opposite side an inlet (4a) and an outlet (4b) for the fluid to be measured. Connectors (5) are provided on the same side as the tongues (8) and the pegs (41) for connecting the detector to an external system. This design is robust and allows to mount the detector to the support in quick and secure manner.

26 Claims, 2 Drawing Sheets

U.S. PATENT DOCUMENTS

| | | |
|---|---|---|
| 6,351,390 B1 | 2/2002 | Mayer et al. |
| 6,443,179 B1 | 9/2002 | Benavides et al. |
| 6,548,895 B1 | 4/2003 | Benavides et al. |
| 6,588,268 B1 | 7/2003 | Yamagishi et al. |
| 6,591,674 B2 | 7/2003 | Gehman et al. |
| 6,600,202 B1 | 7/2003 | Smith, Jr. et al. |
| 6,604,417 B1 | 8/2003 | Koike et al. |
| 6,655,207 B1 | 12/2003 | Speldrich et al. |
| 6,668,642 B2 | 12/2003 | Ambrosina et al. |
| 6,672,154 B1 | 1/2004 | Yamagishi et al. |
| 6,737,579 B1 | 5/2004 | Laufer et al. |
| 6,779,712 B2 | 8/2004 | Kleinlogel et al. |
| 6,813,944 B2 | 11/2004 | Mayer et al. |
| 6,920,786 B2 | 7/2005 | Mayer et al. |
| 7,520,051 B2 * | 4/2009 | Becke et al. ................ 29/832 |
| 7,550,319 B2 * | 6/2009 | Wang et al. ................ 438/125 |
| 2002/0043710 A1 | 4/2002 | Mayer et al. |
| 2002/0078744 A1 | 6/2002 | Gehman et al. |
| 2003/0049877 A1 | 3/2003 | Mayer et al. |
| 2003/0190839 A1 | 10/2003 | Fujita et al. |
| 2004/0050155 A1 | 3/2004 | Okazaki et al. |
| 2004/0118218 A1 | 6/2004 | Mayer et al. |
| 2004/0244511 A1 | 12/2004 | Hueftle et al. |
| 2004/0261522 A1 | 12/2004 | Dykas et al. |

FOREIGN PATENT DOCUMENTS

| | | |
|---|---|---|
| WO | WO 9603721 | 2/1996 |
| WO | WO 0161282 | 8/2001 |
| WO | WO 0184099 | 11/2001 |

\* cited by examiner

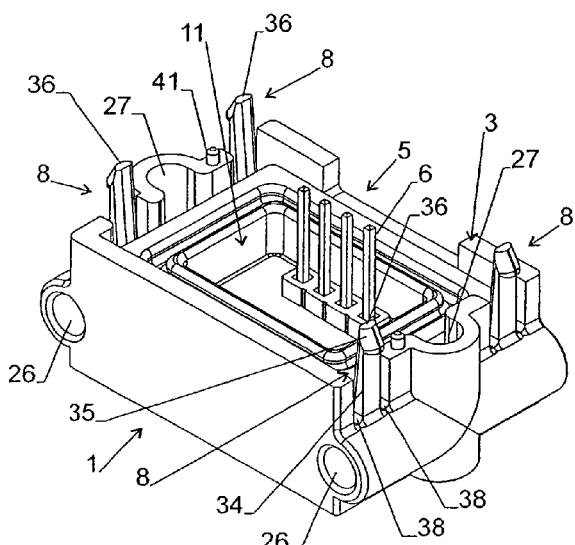
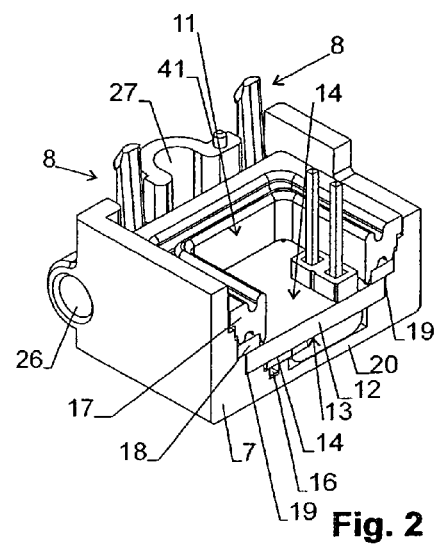
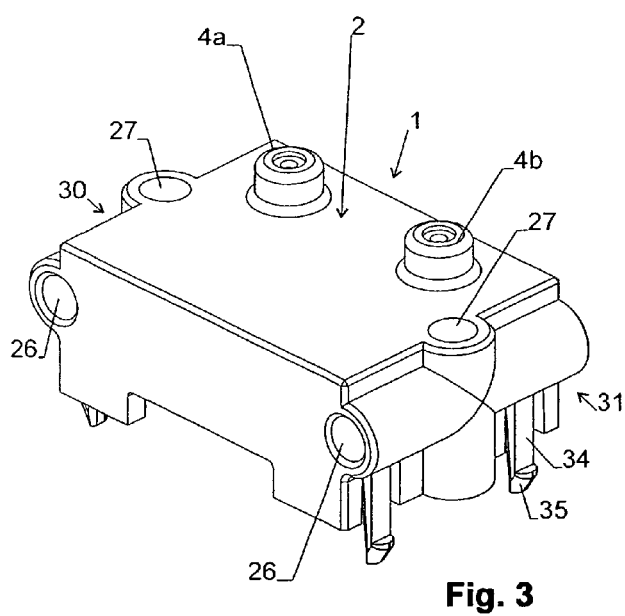
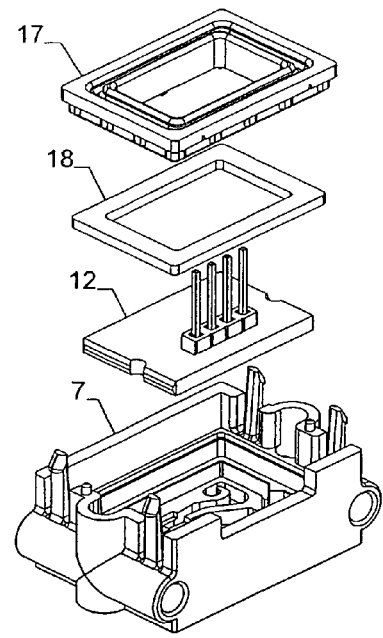
Fig. 1
Fig. 2
Fig. 3
Fig. 4

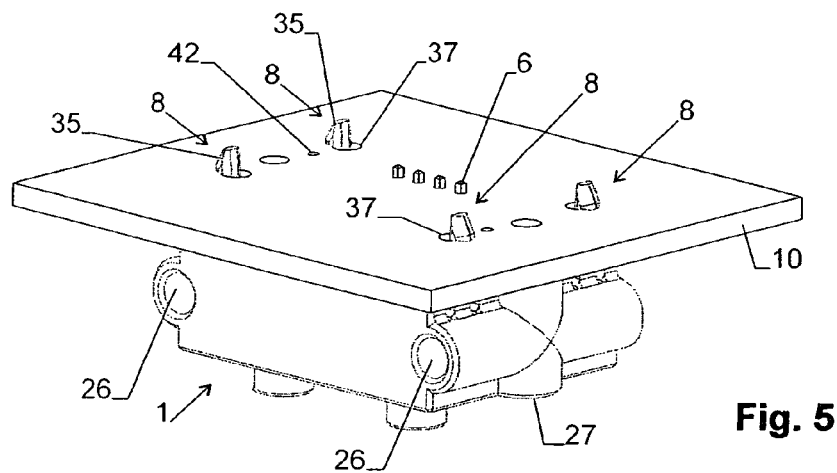
Fig. 5
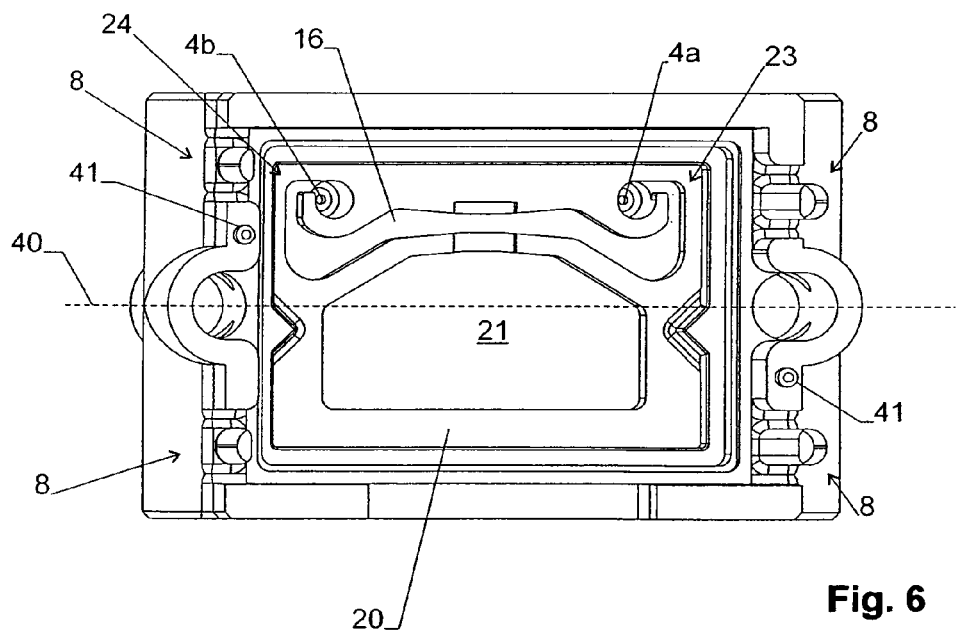
Fig. 6
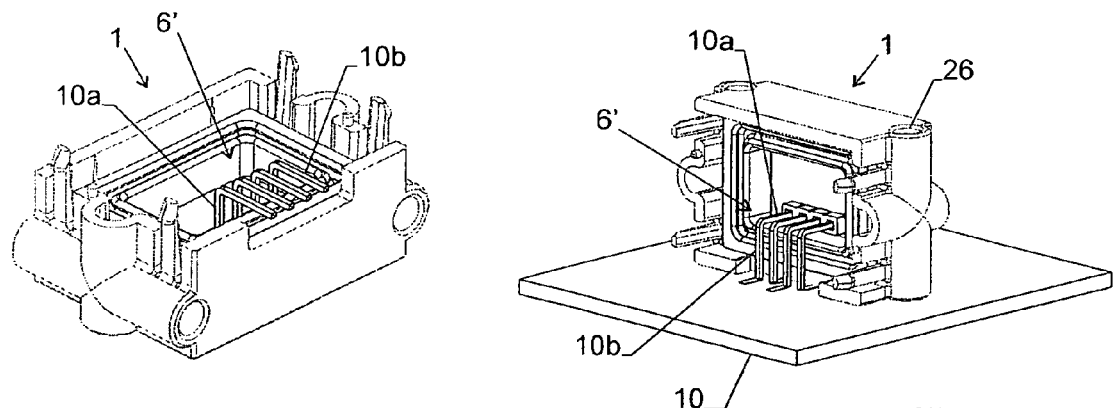
Fig. 7
Fig. 8

FLOW DETECTOR WITH A HOUSING

CROSS REFERENCE TO RELATED APPLICATIONS

This application claims the priority of European application 08006853.9, filed Apr. 4, 2008, as well as of U.S. provisional application 61/123,487 filed Apr. 9, 2008, the disclosure of both of which is incorporated herein by reference in its entirety.

BACKGROUND OF THE INVENTION

The invention relates to a flow detector with a housing, an inlet and an outlet. It also relates to an assembly of such a flow detector and a support plate.

An embodiment of such a flow detector is shown in US 2004/0118218. It comprises a housing having opposite first and second sides. An inlet and an outlet for the fluid are arranged at the first side of the housing. The inlet and outlet are connected by means of a flow channel arranged in the housing. A sensor chip is located at a side of the flow channel and measures the flow therein. At the second side of the housing, electrical connectors are provided for connecting the flow detector to an external system. The connectors extend from the second side of the housing and can e.g. be soldered into a printed circuit board. The connectors are held in a filler material of glass, which, however, may be damaged when mechanical strain is exerted to the housing.

BRIEF SUMMARY OF THE INVENTION

It is therefore an object of the present invention to provide a flow detector of this type with higher mechanical stability.

In a first aspect of the invention, this object is achieved by a flow detector comprising a housing having opposite first and second sides, an inlet and an outlet for said fluid arranged at the first side of said housing, a flow channel arranged in said housing and connecting said inlet and said outlet, a sensor chip arranged at said flow channel and adapted to measure said flow in said flow channel, electrical connectors connected to said sensor chip for connecting said flow detector to an external system, wherein said connectors extend from the second side of said housing, and a plurality of tongues, in addition to said connectors, extending away from the second side of said housing for mechanically mounting said housing to an external support.

In a second aspect of the invention, this object is achieved by a flow detector comprising a housing having opposite first and second sides, a hood formed by a single plastic piece and forming said first side of said housing, an inlet and an outlet for said fluid arranged at the first side of said housing, wherein said inlet and said outlet are integrally attached to said hood and extend away from said hood, a flow channel arranged in said housing and connecting said inlet and said outlet, an internal printed circuit board arranged in said hood, a sensor chip arranged on said internal printed circuit board at said flow channel and adapted to measure said flow in said flow channel, electrical connectors connected to said sensor chip for connecting said flow detector to an external system, wherein said connectors extend from the second side of said housing and are mounted to said internal printed circuit board, and a plurality of tongues, in addition to said connectors, integrally connected to said hood and extending perpendicularly to said internal printed circuit board away from the second side of said housing for mechanically-mounting said housing to an external support.

In a third aspect of the invention, the object is achieved by an assembly of a flow detector for measuring a flow of a fluid and a support plate, said assembly comprising a housing having opposite first and second sides, with said second side lying against a surface of said support plate, an inlet and an outlet for said fluid arranged at the first side of said housing and extending in a direction perpendicular to said support plate, a flow channel arranged in said housing and connecting said inlet and said outlet, a sensor chip arranged at said flow channel and adapted to measure said flow in said flow channel, electrical connectors connected to said sensor chip connecting said flow detector to said support plate, wherein said connectors extend from the second side of said housing into said support plate, and a plurality of tongues, in addition to said connectors, extending perpendicularly to said support plate and away from the second side of said housing into openings in said support plate for mechanically mounting said housing to said support plate.

Accordingly, a plurality of flexible tongues is provided, in addition to the connectors, extending away from the second side of the housing, i.e. extending into a direction away from said housing. These tongues can be used for mechanically mounting the housing to an external support, i.e. a support external to said housing, such as to the printed circuit board mentioned above. Accordingly, mechanical strain can now be received by the tongues, which allows the detector to withstand additional strain.

Advantageously, the tongues have free ends suited for insertion into openings of the external support. Advantageously, they have a comparatively thin neck and a comparatively thick head, with the neck extending from the second side of the housing to the head. Such tongues allow to anchor the detector in suitably sized holes of the support and to hold it therein against pulling forces perpendicular to the support surface. However, in an alternative embodiment, the tongues may also have constant or tapering diameter if they are to secure the device against lateral movements.

In a further advantageous embodiment, one or more pegs are provided at the second side of the housing, in addition to the connectors and the tongues. These pegs project perpendicularly from the second side of the housing. The diameter of the pegs remains constant or decreases with increasing distance from the second side of the housing. Such pegs allow to secure the detector in suitably sized holes of the support and to hold it therein against shearing forces parallel to the support surface.

Advantageously, the housing comprises a hood forming its first side, with the tongues and/or pegs being integrally attached to the same. Such a design allows to transfer mechanical strain from the first side of the housing (such as exerted by tubes attached to the inlet and outlet) directly to the support.

BRIEF DESCRIPTION OF THE DRAWINGS

The invention will be better understood and objects other than those set forth above will become apparent when consideration is given to the following detailed description thereof. Such description makes reference to the annexed drawings, wherein:

FIG. 1 is a view of an embodiment of the detector from the connector side,

FIG. 2 is a view of the embodiment of FIG. 1 with a part sectioned off,

FIG. 3 is a view of the embodiment of FIG. 1 from the inlet/outlet side,

FIG. 4 is an explosive view of the embodiment of FIG. 1,

FIG. 5 is a view of the embodiment of FIG. 1 mounted to a support,

FIG. 6 is a view into the (empty) hood of the embodiment of FIG. 1 from the connector side, FIG. 7 is a view of a second embodiment, and FIG. 8 is a view of the second embodiment mounted to a support.

DETAILED DESCRIPTION OF THE INVENTION

The detector of FIGS. 1-6 comprises a housing generally denoted by 1 having a first side 2 (FIG. 3) formed by a first, substantially flat surface of the housing and a second side 3 (FIG. 1) formed by a second, substantially flat surface of the housing. An inlet 4a and an outlet 4b (FIG. 3) project from first side 2, each formed by a hollow stub suited for being connected to a tube guiding the fluid. A series of electrical connectors 5, each formed by a metal pin 6, project perpendicularly from second side 3 of housing 1 (FIG. 1).

As can best be seen from FIG. 2, housing 1 comprises a hood 7, which forms first side 2. Hood 7 is a single plastic piece e.g. manufactured by injection molding. Hood 7 carries at least two, advantageously four tongues 8, which extend from second side 3. They serve to mechanically mount housing 1 to a support or support plate 10, such as an external printed circuit board, as shown in FIG. 5. Support or support plate 10 is external to housing 1, i.e. not an integral part thereof. Second side 3 of housing 1 rests against a surface of support plate 10.

The tongues 8 as well as inlet 4a and outlet 4b are integrally attached to hood 7, i.e. hood 7, tongues 8, inlet 4a and outlet 4b are a single piece of material.

As can be seen e.g. from FIG. 3, the subs of inlet 4a and outlet 4b extend parallel to the tongues 8, namely in a direction perpendicular to the surface of the second side 3 of housing 1 as well as perpendicular to support plate 10.

As can be seen from FIG. 2, hood 7 forms a recess 11, which receives a plate 12, e.g. a printed circuit board. To distinguish this printed circuit board from the external printed circuit board formed by plate 10, it is called the internal printed circuit board.

As can be seen from FIGS. 4 and 5, plates 10 and 12 are arranged parallel to each other. Plate 12 carries on a first side 13 thereof, a sensor chip 14. Sensor chip 14 is e.g. a thermal flow sensor such as described in US 2002/0043710. The backside of sensor chip 14 lies flush against plate 12, while the front side of sensor chip 14, which carries the flow sensing elements, is facing a flow channel 16 that connects inlet 4a with outlet 4b. Plate 12 also carries the connectors 5, i.e. the connectors 5 are mounted to plate 12. The connectors 5 project from a second side 14 of plate 12. Leads on plate 12 as well as bond wires are used to electrically connect the connectors 5 to contact pads on sensor chip 14.

Plate 12 forms part of the second side 3 of housing 1. It is held in recess 11 by a frame 17, which is also inserted into recess 11 and has been welded to its walls. Frame 17 pushes against second side 14 of plate 12, thereby holding it in place.

A sealing ring 18 of an elastic material, such as silicone, is arranged between frame 17 and plate 12 for preventing the fluid from exiting at second side 3 of housing 1. Sealing ring 18 in particular covers a gap 19 between the outer rim of plate 12 and the inner walls of hood 7 for sealing the same. Sealing ring 18 obviates the need for a fluid tight seal right at the rims of flow channel 16—such a seal would be difficult to achieve, in particular in the region of sensor chip 14.

Flow channel 16 is formed as a groove extending along an inner side of a wall 20 of hood 7. Wall 20 forms first side 2 of housing 1. Flow channel 16 is covered by plate 12 and sensor chip 14.

The design of the inner side of wall 20 is best seen from FIG. 6. Apart from the groove forming flow channel 16, wall 20 further comprises a recess 21, which serves to provide room for the bond wires and a protective glob used to connect sensor chip 14 to plate 12.

As can be seen from FIG. 6, flow channel 16 extends in a plane parallel to first side 2 of housing 1. It has a first end 23 connected to inlet 4a and a second end 24 connected to outlet 4b. First end 23 and/or second end 24, advantageously both of them, are looped around at least 180° of inlet 4a and outlet 4b, respectively. In this context, "looped around at least 180°" means that, the path of the end section is wound at least around 180° of the circumference of the inlet and outlet, respectively.

This allows to increase the actual length of flow channel 16, which in turn decreases the risk of turbulences at the location of semiconductor chip 14.

Hood 7 of housing 1 is further provided with screw holders for receiving attachment screws or attachment pins, which allow, if necessary, to mount housing 1 more securely to a support. In the embodiment shown here, two types of screw holders are provided, which will in the following be called "first screw holders" and "second screw holders". The first screw holders 26 extend parallel to first side 2 and second side 3 of housing 1, while the second screw holders 27 extend perpendicular thereto. Thus, the first screw holders are structured to hold a screw parallel to first side 2 and second side 3, while the second screw holders are structured to hold a screw perpendicular thereto. To allow to mount the same housing 1 in two different orientations, namely with side 3 parallel to a support 10, such as shown in FIG. 5 (where the second screw holders 27 can be used to attach hood 7 to base 10), or with side 3 perpendicular to support 10, such as shown in the embodiment of FIG. 8 (where the first screw holders 26 can be used to attach hood 7 to base 10).

As can be seen, the embodiment shown here has a total of four screw holders, namely one first and one second screw holder on a third side 30 of housing 1 (FIG. 3), and one first and one second screw holder on a fourth side 31 of housing 1, with third side 30 being opposite to fourth side 31 and both of them being perpendicular to first side 2 and second side 3 of housing 1.

A larger number of screw holders could be provided as well, in particular for large housings 1.

Each first screw holder is formed by a first through-hole through hood 7 and each second screw holder 27 is formed by a second through-hole through hood 7. The through-holes are adapted to e.g. receive a screw or pin. In order to achieve a compact design, the first through-hole and the second through-hole on the same side of housing 1 intersect.

As mentioned, the tongues 8 serve to anchor housing 1 in support 10 and to secure it against pulling forces. For this purpose, each tongue 8 is provided with a thin neck 34 and a thicker head 35 (FIG. 1). Neck 34 extends between hood 7 of housing 1 and head 35. Head 35, whose maximum diameter exceeds the diameter of neck 34, is wedge-shaped and tapered towards its end 36 facing away from housing 1. Hence, each tongue 8 can easily be inserted into suitably positioned and sized openings 37 in support 10 (see FIG. 5), where they snap in once that head 35 has passed fully. Hence, the heads 35 form hooks that hold housing 1 tightly in support 10, securing it against pulling forces.

For inserting the tongues 8 into the holes 37 of support 10, the tongues need to be deformed laterally. To facilitate such a deformation, each tongue is mounted in a recessed section 38 of the side walls of hood 7, as shown in FIGS. 1 and 3, which allows to increase the length of neck 34, thereby making it more resilient.

As can best be seen from FIG. 6, the tongues are arranged "with rotational asymmetry in respect to any axis of rotation extending through the first and second side of the housing". This is to be understood such that there is no axis of rotational symmetry perpendicular to the first and second side 2, 3 of housing 1. In other words, on a support 10 parallel to first and second side 2, 3, the detector can be mounted in a single orientation only if the tongues 8 are to be inserted into the openings 37. Thereby it can be assured that the measured signal has the correct sign and the connector 5 is oriented properly. In the embodiment of FIG. 6, this is achieved by placing one tongue closer to the longitudinal axis 40 of housing 1 than the other tongues.

The resilience of the necks 34 facilitates the insertion of the tongues 8 into the holes 37, but it renders the tongues 8 poorly suited to withstand lateral forces against housing 1. In addition to this, the holes 37 in support 10 must have a larger diameter than the necks 34 for allowing passage of the heads 35, which can give rise to lateral play of the fully inserted housing 1. Hence, in addition to the tongues 8, housing 1 comprises at least one, advantageously at least two, pegs 41 projecting perpendicularly from second side 3. These pegs 41 can best be seen in FIGS. 1 and 6. Each peg 41 has a diameter that remains substantially constant or decreases with increasing distance from second side 3 of housing 1, such that it can be inserted tightly into a suitably sized hole 42 of support 10 (FIG. 5). The pegs 41 are therefore able to secure housing 1 against lateral movements in respect to support 10.

The pegs 41 are, as the tongues 8, integrally attached to hood 7.

As mentioned, the connectors 5 are formed by a plurality of pins 6. In the embodiments shown here, the pins 6 are arranged in a single line. They project perpendicularly from second side 3 of housing 1.

If the detector is to be mounted in the position of FIG. 5, the pins 6 are advantageously straight such that they can be inserted into suitable openings in position 10.

If, however, the detector is to be mounted on a support 10 perpendicular to first side 2 and second side 3, angled pins 6' have to be used, as shown in FIGS. 7 and 8. These angled pins have a first section 10a extending substantially perpendicularly from second side 3 of housing 1 and a second section 10b extending at a right angle to first section 10a.

While there are shown and described presently preferred embodiments of the invention, it is to be distinctly understood that the invention is not limited thereto but may be otherwise variously embodied and practised within the scope of the following claims.

The invention claimed is:

1. A flow detector for measuring a flow of a fluid comprising a housing having opposite first and second sides,
an inlet and an outlet for said fluid arranged at the first side of said housing,
a flow channel arranged in said housing and connecting said inlet and said outlet,
a sensor chip arranged at said flow channel and adapted to measure said flow in said flow channel,
electrical connectors connected to said sensor chip for connecting said flow detector to an external system, wherein said connectors extend from the second side of said housing, and
a plurality of tongues, in addition to said connectors, extending away from the second side of said housing for mechanically mounting said housing to an external support.

2. The flow detector of claim 1 wherein said inlet and said outlet are formed by hollow stubs projecting away from said first side.

3. The flow detector of claim 2 wherein said stubs extend parallel to said tongues.

4. The flow detector of claim 1 wherein said first side is formed by a first surface of said housing and said second side is formed by a second surface of said housing.

5. The flow detector of claim 1 wherein said tongues have free ends suited for insertion into openings of said external support.

6. The flow detector of claim 5 wherein each tongue comprises a head and a neck, wherein said neck extends between said second side of said housing and said head and wherein said neck has a diameter smaller than a maximum diameter of said head, and in particular wherein said head is tapered towards an end facing away from said housing.

7. The flow detector of claim 1 wherein said tongues are arranged with rotational asymmetry in respect to any axis of rotation extending through said first and second side of said housing.

8. The flow detector of claim 1 wherein said housing comprises, in addition to said connectors and said tongues, at least one peg projecting perpendicularly from said second side of said housing, wherein a diameter of said peg remains constant or decreases with increasing distance from said second side of said housing.

9. The flow sensor of claim 1 wherein said housing comprises a hood forming said first side of said housing, wherein said tongues are integrally attached to said hood.

10. The flow sensor of the claim 9 wherein said housing comprises, in addition to said connectors and said tongues, at least one peg projecting perpendicularly from said second side of said housing, wherein a diameter of said peg remains constant or decreases with increasing distance from said second side of said housing, and wherein said peg or pegs is/are integrally attached to said hood.

11. The flow detector of claim 1 further comprising a internal printed circuit board, wherein said sensor chip is mounted to a first side of said internal printed circuit board and said connectors project from a second side of said internal printed circuit board.

12. The flow detector of claim 11 wherein said internal printed circuit board forms at least part of said second side of said housing.

13. The flow detector of claim 11 wherein said sensor chip lies flush against said internal printed circuit board.

14. The flow detector of claim 11 wherein said housing comprises a hood forming said first side of said housing and wherein said internal printed circuit board resides in a recess of said hood and is held in said recess by a frame pushing towards said second side of said plate.

15. The flow detector of claim 14 further comprising a sealing ring arranged between said frame and said plate for preventing said fluid from exiting at said second side of said housing.

16. The flow detector of claim 11 wherein said housing comprises a wall forming said first side of said housing, wherein said channel is formed by a groove extending at an inner side of said wall and covered by said internal printed circuit board.

17. The flow detector of claim 1 wherein said flow channel extends in a plane parallel to said first side of said housing and has a first end connected to said inlet and a second end connected to said outlet, wherein said first end and/or said second end is/are looped around at least 180° of said inlet and/or outlet, respectively.

18. The flow detector of claim 1 further comprising at least one first and at least one second screw holder for receiving an attachment screw or attachment pin, wherein said at least one first screw holder is structured to hold a screw in a direction parallel to said first and said second sides of said housing and said at least one second screw holder is structured to hold a screw in a direction perpendicular to said first and said second sides of said housing.

19. The flow detector of claim 18 further comprising at least one first and at least one second screw holder on a third side of said housing and at least one first and at least one second screw holder on a fourth side of said housing, wherein said fourth side is opposite said third side.

20. The flow detector of claim 18 wherein said first screw holder comprises a first through-hole and said second screw holder comprises a second through-hole, wherein said first and said second through-holes intersect.

21. The flow detector of claim 1 wherein said connectors comprise pins projecting perpendicularly from said second side of said housing.

22. The flow detector of claim 21 wherein said pins are straight.

23. The flow detector of claim 21 wherein said pins have a first section extending perpendicularly from said second side of said housing and a second section extending at a right angle to said first section.

24. A flow detector for measuring a flow of a fluid comprising
a housing having opposite first and second sides,
a hood formed by a single plastic piece and forming said first side of said housing,
an inlet and an outlet for said fluid arranged at the first side of said housing, wherein said inlet and said outlet are integrally attached to said hood and extend away from said hood,
a flow channel arranged in said housing and connecting said inlet and said outlet,
an internal printed circuit board arranged in said hood,
a sensor chip arranged on said internal printed circuit board at said flow channel and adapted to measure said flow in said flow channel,
electrical connectors connected to said sensor chip for connecting said flow detector to an external system, wherein said connectors extend from the second side of said housing and are mounted to said internal printed circuit board, and
a plurality of tongues, in addition to said connectors, integrally connected to said hood and extending perpendicularly to said internal printed circuit board away from the second side of said housing for mechanically mounting said housing to an external support.

25. An assembly of a flow detector for measuring a flow of a fluid and a support plate comprising
a housing having opposite first and second sides, with said second side lying against a surface of said support plate,
an inlet and an outlet for said fluid arranged at the first side of said housing and extending in a direction perpendicular to said support plate,
a flow channel arranged in said housing and connecting said inlet and said outlet,
a sensor chip arranged at said flow channel and adapted to measure said flow in said flow channel,
electrical connectors connected to said sensor chip connecting said flow detector to said support plate, wherein said connectors extend from the second side of said housing into said support plate, and
a plurality of tongues, in addition to said connectors, extending perpendicularly to said support plate and away from the second side of said housing into openings in said support plate for mechanically mounting said housing to said support plate.

26. The assembly of claim 25 wherein said housing comprises a hood, wherein said inlet and said outlet as well as said tongues are integrally connected to said hood, and wherein said flow detector further comprises an internal printed circuit board arranged in said hood, wherein said sensor chip and said electrical connectors are mounted to said internal printed circuit board and wherein said internal printed circuit board is arranged parallel to said support plate.

* * * * *